United States Patent
Lillard et al.

(10) Patent No.: US 12,113,797 B2
(45) Date of Patent: *Oct. 8, 2024

(54) SYSTEM AND METHOD FOR AUTHORIZING ENTITY USERS BASED ON AUGMENTED REALITY AND LiDAR TECHNOLOGY

(71) Applicant: BANK OF AMERICA CORPORATION, Charlotte, NC (US)

(72) Inventors: Elliott Leonard Lillard, Denver, CO (US); Regina Yee Cadavid, San Gabriel, CA (US); Gloria Youngsook Joo, Moorpark, CA (US); Jinyoung Nathan Kim, Charlotte, NC (US); Ramkumar Korlepara, McKinney, TX (US); Nia Mack, Addison, TX (US); Philip Lone Mintac, Charlotte, NC (US); Michael Jacob Richardson, Chicago, IL (US); Brandon Sloane, Indian Land, SC (US); Srilekha Mudumbai Srinivasa, Murphy, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,346

(22) Filed: Jul. 12, 2023

(65) Prior Publication Data

US 2023/0353577 A1 Nov. 2, 2023

Related U.S. Application Data

(63) Continuation of application No. 17/199,021, filed on Mar. 11, 2021, now Pat. No. 11,757,893.

(51) Int. Cl.
*H04L 9/40* (2022.01)
*G01S 17/42* (2006.01)
*G06F 3/01* (2006.01)

(52) U.S. Cl.
CPC ............ *H04L 63/102* (2013.01); *G01S 17/42* (2013.01); *G06F 3/011* (2013.01); *H04L 63/083* (2013.01);

(Continued)

(58) Field of Classification Search
CPC . H04L 63/102; H04L 63/083; H04L 63/0853; H04L 63/0876; H04L 63/107;
(Continued)

(56) References Cited

U.S. PATENT DOCUMENTS 8,750,570 B2   6/2014  Kerschner et al.
8,989,053 B1 *  3/2015  Skaaksrud ............ H04L 65/403
                                              370/255

(Continued)

FOREIGN PATENT DOCUMENTS

WO   2019193337 A1   10/2019

OTHER PUBLICATIONS

Cambridge Consultants. Apr. 16, 2013 https://www.laserfocusworld.com/lasers-sources/article/16561388/cambridge-consultants-and-ingenia-technology-develop-laser-scanner-for-authentication-and-brand-protection.

*Primary Examiner* — Khoi V Le
(74) *Attorney, Agent, or Firm* — Moore & Van Allen PLLC; Nicholas C. Russell

(57) ABSTRACT

Embodiments of the present invention provide a system for authorizing entity users based on augmented reality and LiDAR technology. In particular, the system may be configured to receive a unique identifier from a user device of the user, where the unique identifier is scanned using LiDAR (Continued)

technology present in the user device of the user, determine location of the user based on the unique identifier, determine an entity device associated with the unique identifier and location of the user, perform authentication of the user using at least one authentication method, determine that the authentication is successful, and in response to determining that the authentication is successful, provide access to an entity device.

20 Claims, 5 Drawing Sheets

(52) U.S. Cl.
CPC ...... *H04L 63/0853* (2013.01); *H04L 63/0876* (2013.01); *H04L 63/107* (2013.01)

(58) Field of Classification Search
CPC .......... G01S 17/42; G01S 17/88; G06F 3/011; G06F 21/31; H04W 12/06; H04W 12/63; H04W 12/71
See application file for complete search history.

(56) References Cited

U.S. PATENT DOCUMENTS

| | | |
|---|---|---|
| 10,614,503 B2 | 4/2020 | High et al. |
| 2018/0115797 A1* | 4/2018 | Wexler ............ H04N 21/41407 |
| 2019/0049583 A1 | 2/2019 | Xu |
| 2019/0287063 A1* | 9/2019 | Skaaksrud ............. B25J 9/1679 |
| 2020/0045540 A1 | 2/2020 | Hutchison et al. |
| 2020/0076786 A1 | 3/2020 | Ha et al. |
| 2020/0193006 A1 | 6/2020 | Krieg et al. |
| 2020/0284883 A1 | 9/2020 | Horn et al. |
| 2020/0366671 A1* | 11/2020 | Larson .................... G06F 9/451 |

* cited by examiner

SYSTEM AND METHOD FOR AUTHORIZING ENTITY USERS BASED ON AUGMENTED REALITY AND LiDAR TECHNOLOGY

CROSS-REFERENCE TO RELATED APPLICATION

This application claims priority to and is a continuation application of U.S. patent application Ser. No. 17/199,021, filed Mar. 11, 2021 of the same title; the contents of which are also incorporated herein by reference.

BACKGROUND

Conventional systems typically require physical interactions between entity users and entity devices for performing one or more interactions. However, in some instances physical interaction is not desirable. As such, there exists a need for system to securely perform authorization of entity users without needing any physical interaction between entity users and entity devices.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for authorizing entity users based on Augmented Reality (AR) and Light Detection And Ranging (LiDAR) technology. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user has accessed an entity application provided by an entity via a user device, receives a unique identifier from the user device of the user, via the entity application, where the unique identifier is scanned using LiDAR technology present in the user device of the user, determines location of the user based on the unique identifier, determines an entity device associated with the unique identifier and location of the user, performs authentication of the user using at least one authentication method, determines that the authentication is successful, and in response to determining that the authentication is successful, provides access to an entity device.

In some embodiments, the unique identifier is at least one of a token, a braille dots identifier, and an object.

In some embodiments, the present invention continuously receives LiDAR scans from the user device, via the entity application and determines real-time granular location of the user based on the LiDAR scans.

In some embodiments, the present invention allows access to the entity device based on the real-time granular location of the user and allows user to perform one or more interactions with the entity device to gain access to one or more resources, wherein the one or more resources are user resources or entity resources.

In some embodiments, the present invention in response to determining that the authentication is successful, establishes a connection between the entity device and the user device based on the real-time granular location of the user.

In some embodiments, the at least one authentication method comprises: modifying user interface of the user device or a secondary user device of the user to display an augmented reality environment, wherein the augmented reality environment comprises a keypad for entering a passcode, prompting the user to provide the passcode via the keypad in the augmented reality environment, receive the passcode from the user device of the user, determining that the passcode provided by the user matches one or more user records, and authenticating the user based on determining that the passcode matches the one or more user records.

In some embodiments, the secondary user device is an augmented reality device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
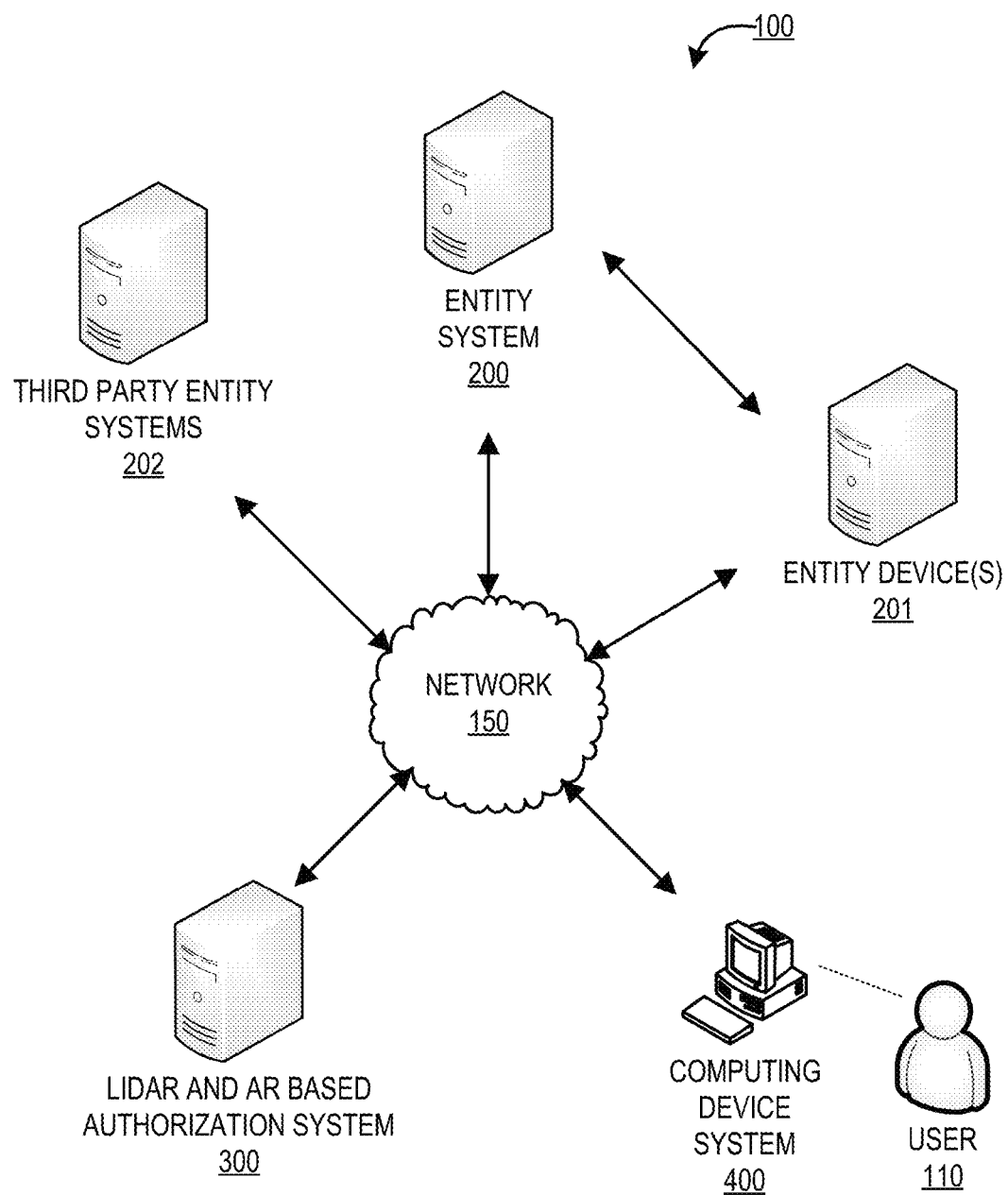
Figure 2:
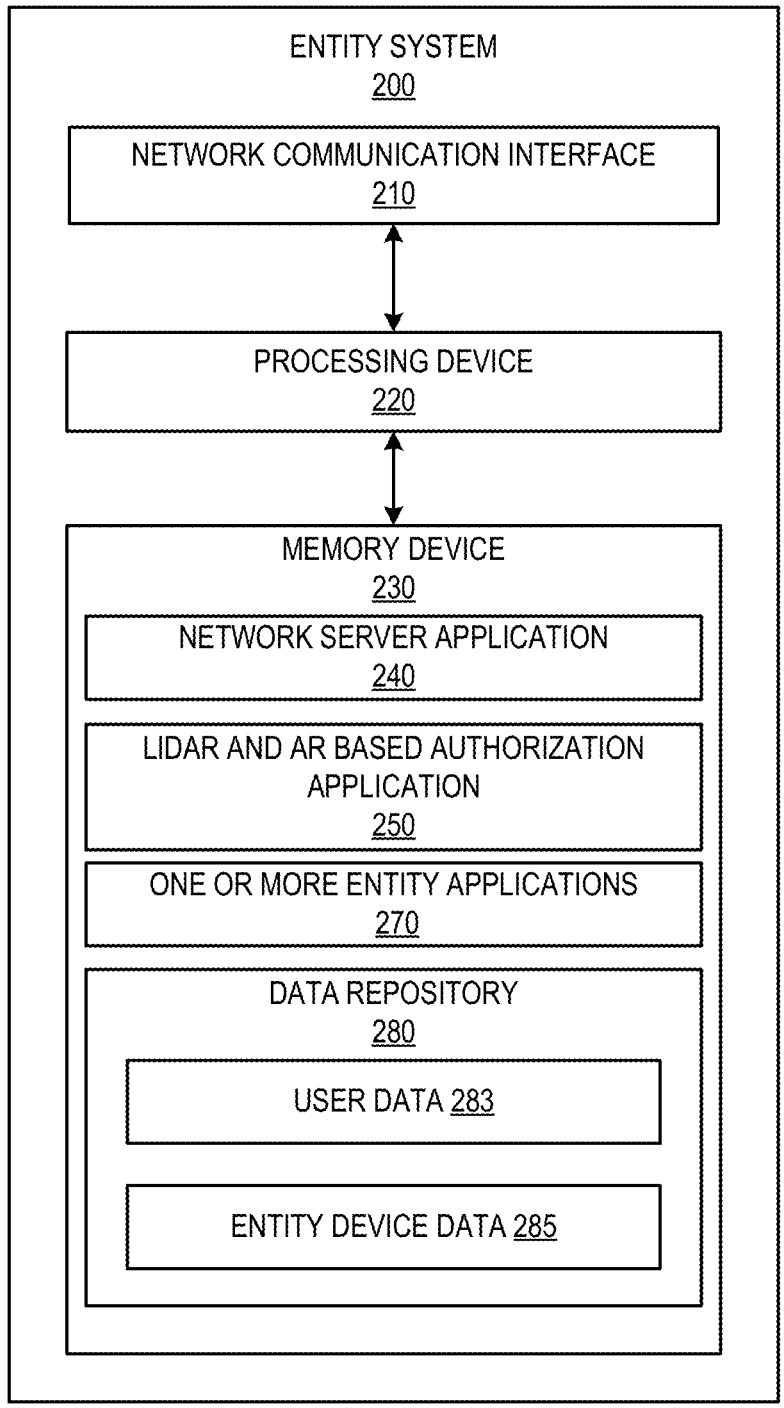
Figure 3:
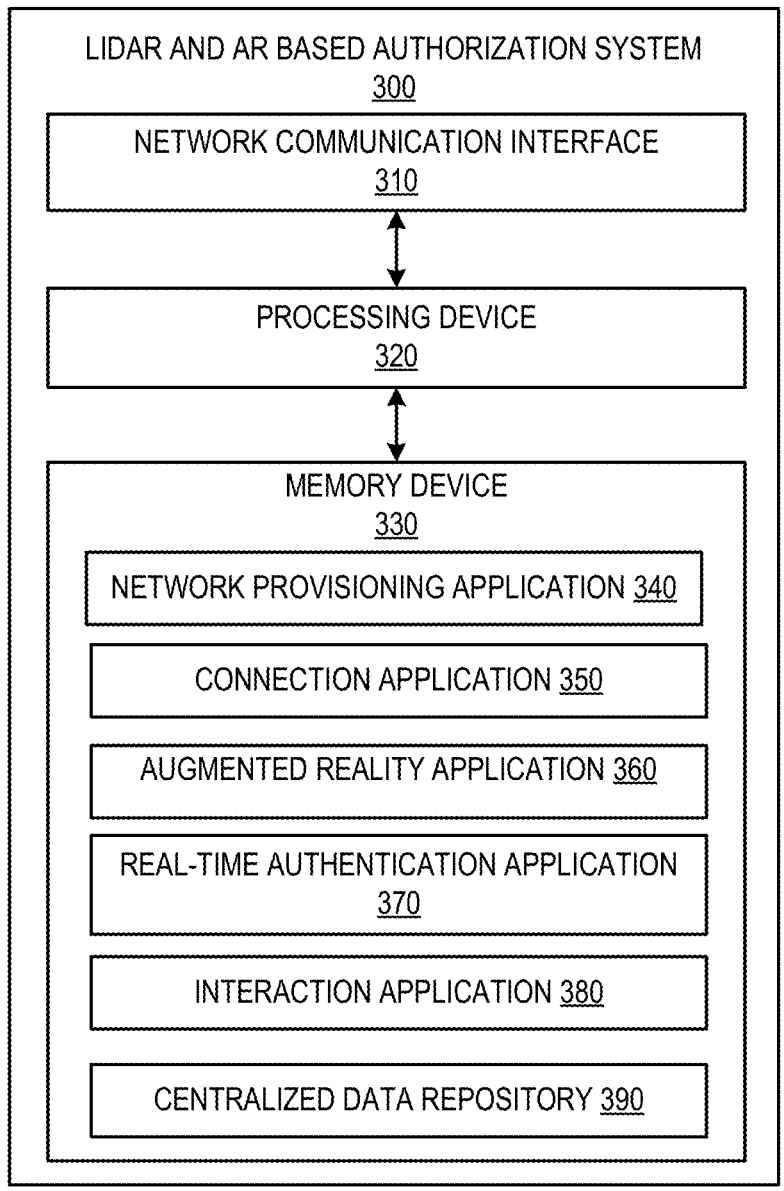
Figure 4:
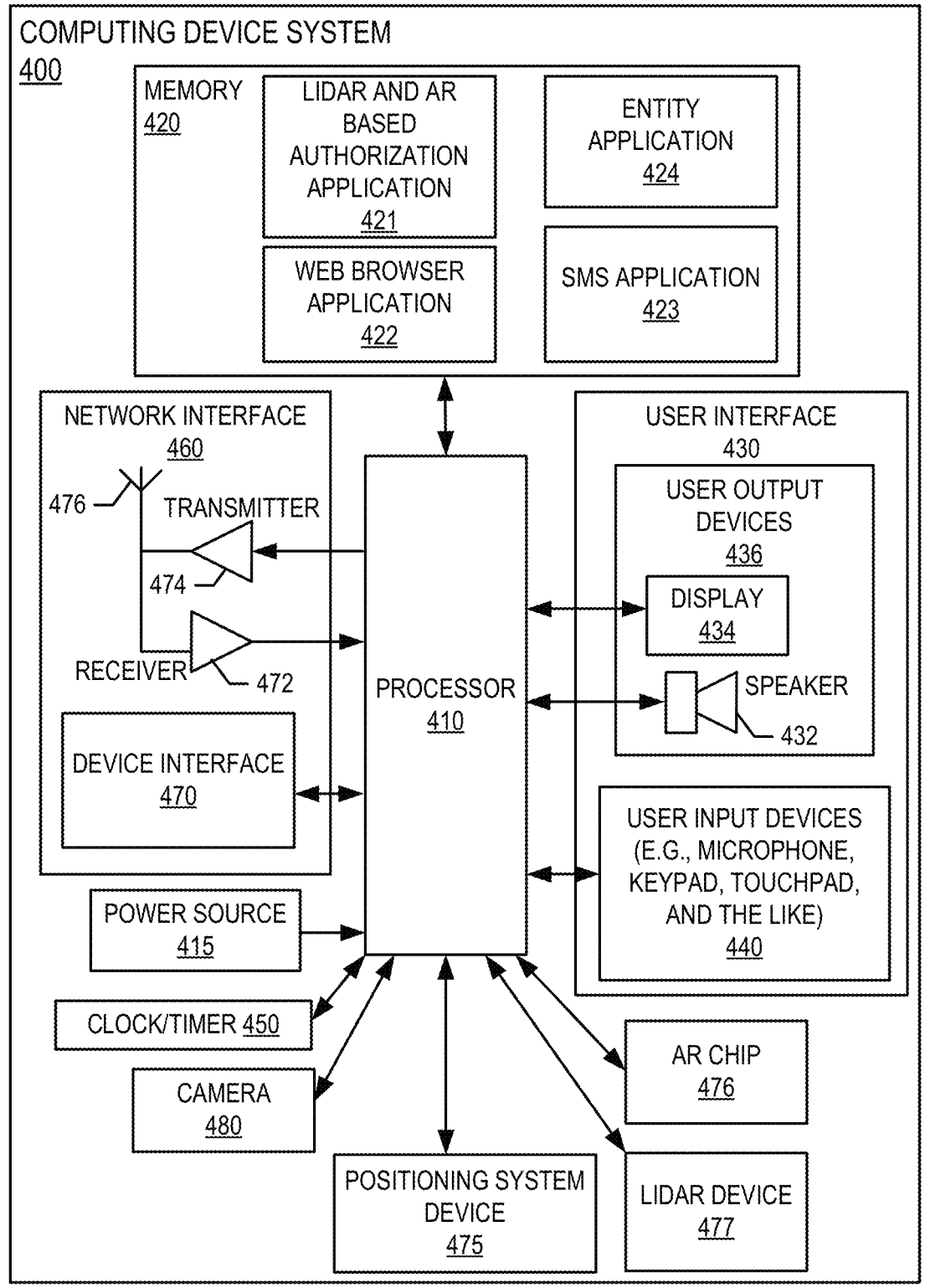
Figure 5:
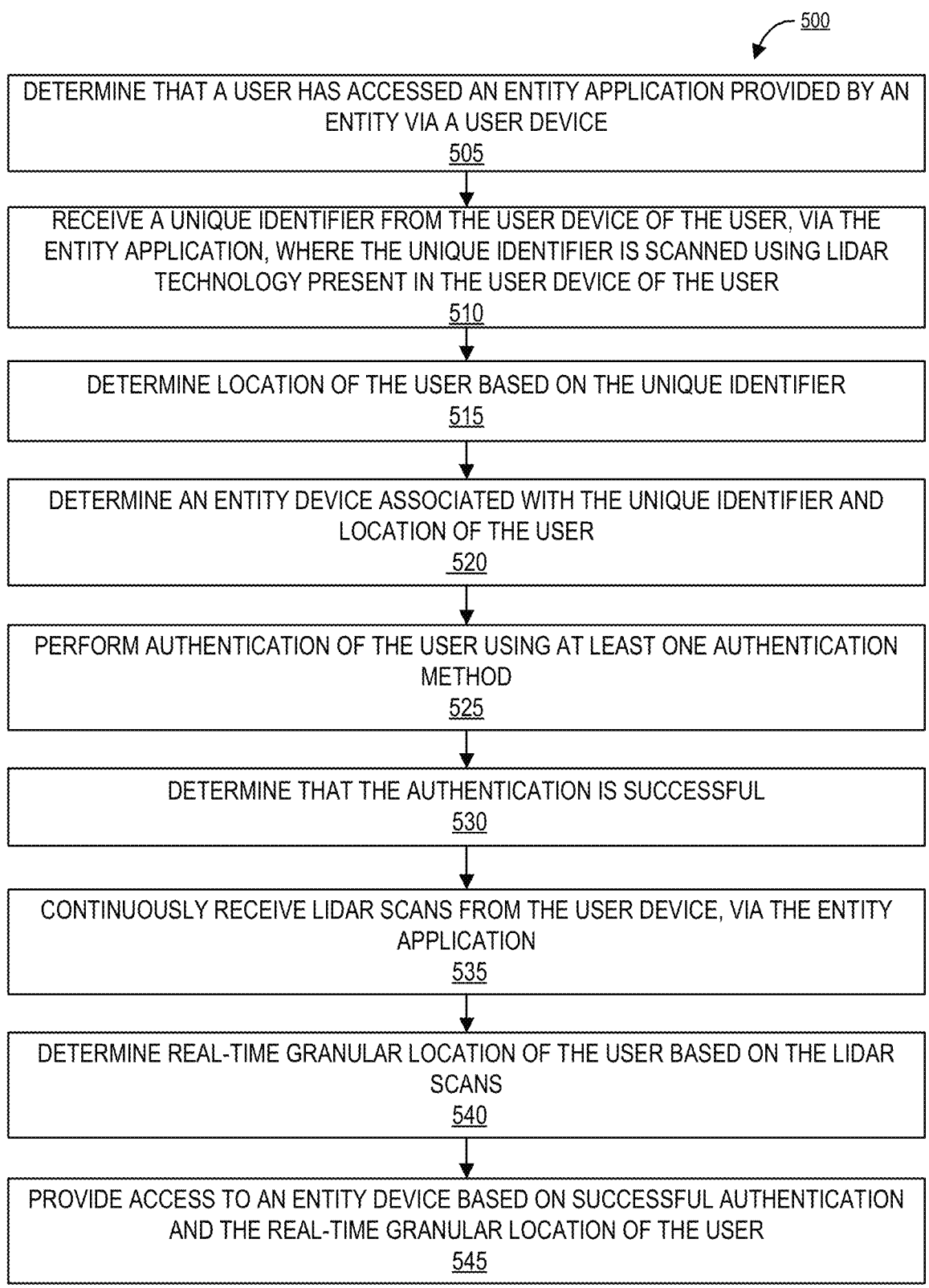

Having thus described embodiments of the invention in general terms, reference will now be made the accompanying drawings, wherein:

FIG. 1 provides a block diagram illustrating a system environment for authorizing entity users based on augmented reality and LiDAR technology, in accordance with an embodiment of the invention;

FIG. 2 provides a block diagram illustrating the entity system 200 of FIG. 1, in accordance with an embodiment of the invention;

FIG. 3 provides a block diagram illustrating a LiDAR and AR based authorization system 300 of FIG. 1, in accordance with an embodiment of the invention;

FIG. 4 provides a block diagram illustrating the computing device system 400 of FIG. 1, in accordance with an embodiment of the invention; and FIG. 5 provides a block diagram illustrating a process flow for authorizing entity users based on augmented reality and LiDAR technology, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "entity" may be any institution which involves in financial transactions. In one embodiment, the term "entity" or "resource entity" may be any financial institution. As used herein, the term "entity device" may be any device associated with the entity. In some embodiments of the present invention, the entity device may be an automated machine. In some embodiments, the "automated machine" may be any automated device that is involved in distribution of resources such as cash, checks, electronic transfers, money orders or the like which may be performed using a credit card, a debit card, or the like. In one embodiment of the present invention, the automated machine may be an Automated Teller Machine (ATM). In some embodiments, the "automated machine" may be any automated device that provides information associated with resource pools of the user. In some embodiments, the automated machine may be owned, controlled, managed, and/or maintained by the entity.

In some embodiments, the "entity" may be a non-financial institution. In such instances, the entity may be any organization that allows one or more entity users to access one or more entity resources. As used herein, the term "entity resources" may be building facilities, one or more secure machines that allow users to perform one or more organization activities, or the like. In such embodiments, "entity devices" may be a gate, checkpoint, or the like that authorizes users to pass through to access one or more entity resources after successful authentication.

As described herein, a "user" or an "entity user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution. In some embodiments, "user" or "entity user" may be an employee of the entity.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, convention systems require physical interaction between entity users and entity devices for performing one or more interactions. In one example, conventional system may require entity users to provide a finger print via an entity device to gain access to user resources or entity resources. However, in some instances physical interaction is not desirable. As such, there exists a need for system to securely perform authorization of entity users without needing any physical interaction between entity users and entity devices. The system of the present invention provides a novel and secure way to perform authorization of entity users based on Augmented Reality (AR) and Light Detection And Ranging (LiDAR) technology.

FIG. 1 provides a block diagram illustrating a system environment 100 for authorizing entity users based on augmented reality and LiDAR technology, in accordance with an embodiment of the invention. As illustrated in FIG. 1, the environment 100 includes a LiDAR and Augmented Reality (AR) based authorization system 300, entity system 200, one or more entity devices 201, third party entity systems 202, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more user(s) 110 may be employees of the entity, including but not limited to, full time employees, part time employees, contractors, subcontractors, or the like.

The entity system(s) 200 may be any system owned or otherwise controlled by an entity to support or perform one or more process steps described herein. In some embodiments, the entity is a financial institution. In some embodiments, the process or the solution provided herein may be applicable to entities that are non-financial institutions and that have a need for authenticating users to access one or more entity devices or entity resources. In some embodiments, the one or more entity devices 201 may be owned, operated, controlled, and/or maintained by the entity. In some embodiments, one or more entity devices 201 may be owned, operated, controlled, and/or maintained by a third party entity associated with the third party entity system 202, where the third party entity works in collaboration with the entity associated with the entity system 200.

The LiDAR and AR based authorization system 300 is a system of the present invention for performing one or more process steps described herein. In some embodiments, the LiDAR and AR based authorization system 300 may be an independent system. In some embodiments, the LiDAR and AR based authorization system 300 may be a part of the entity system 200.

The LiDAR and AR based authorization system 300, the entity system 200, the one or more entity devices 201, the third party entity systems 202, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the LiDAR and AR based authorization system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the LiDAR and AR based authorization system 300, and/or entity system 200 across the network 150. In some embodiments, the computing device system 400 may be any device of the user that has LiDAR technology and Augmented Reality (AR) technology to support one or more functions provided by the system of the present invention. In some embodiments, there may be multiple user devices with a communicable link that work together for implementing different aspects of the present invention. For example, a first user device may comprise LiDAR technology and a second user device may support Augmented Reality technology. In some embodiments, a single user device may support LiDAR technology and Augmented Reality technology.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a LiDAR and AR based authorization application 250, one or more entity applications 270, and a data repository 280 comprising user data 283 and entity device data 285, where the user data 283 comprises data associated with users 110 and/or one or more resource pools associated with the users 110 and the entity device data 283 comprises information associated with entity devices, including but not limited, one or more device unique identifier (e.g., token, braille dots identifier, object, or any other identifier that has structured surface), location information, physical device data, software data, or the like. The one or more entity applications 270 may be any applications provided by the entity that allows users 110 to access information and/or perform one or more actions associated with (i) one or more resource pools of the users 110 and/or (ii) one or more entity resources associated with the entity. The computer-executable program code of the network server application 240, the LiDAR and AR based authorization application 250, the one or more entity application 270 to perform certain logic, data-extraction, and data-storing functions of the entity system 200 described herein, as well as communication functions of the entity system 200. In some embodiments, the entity system 200 may comprise one or more different systems or servers that host each of the one or more entity applications 270 of the entity, where each of the entity applications 270 may be a separate channel that servers the users 110. In one example, the entity application 270 may be a mobile banking application. In another example, the entity application 270 may be a web based online banking application. In another example, the entity application 270 may be an application installed on an employee computing system (e.g., financial center employee computing system, or the like) for gaining access to one or more entity resources.

The network server application 240, the LiDAR and AR based authorization application 250 and the one or more entity applications 270 are configured to store data in the data repository 280 or to use the data stored in the data repository 280 when communicating through the network communication interface 210 with the LiDAR and AR based authorization system 300, and/or the computing device system 400 to perform one or more process steps described herein. In some embodiments, the entity system 200 may receive instructions from the LiDAR and AR based authorization system 300 via the LiDAR and AR based authorization application 250 to perform certain operations. The LiDAR and AR based authorization application 250 may be provided by the LiDAR and AR based authorization system 300.

FIG. 3 provides a block diagram illustrating the LiDAR and AR based authorization system 300 in greater detail, in accordance with embodiments of the invention. As illustrated in FIG. 3, in one embodiment of the invention, the LiDAR and AR based authorization system 300 includes one or more processing devices 320 operatively coupled to a network communication interface 310 and a memory device 330. In certain embodiments, the LiDAR and AR based authorization system 300 is operated by a first entity, such as a financial institution, while in other embodiments, the LiDAR and AR based authorization system 300 is operated by an entity other than a financial institution. In some embodiments, the LiDAR and AR based authorization system 300 is owned or operated by the entity of the entity system 200. In some embodiments, the LiDAR and AR based authorization system 300 may be an independent system. In alternate embodiments, the LiDAR and AR based authorization system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the LiDAR and AR based authorization system 300 described herein. For example, in one embodiment of the LiDAR and AR based authorization system 300, the memory device 330 includes, but is not limited to, a network provisioning application 340, a connection application 350, an augmented reality application 360, a real-time authentication application 370, an interaction application 380, and a centralized data repository 390 comprising data processed or accessed by one or more applications in the memory device 330. The computer-executable program code of the network provisioning application 340, the connection application 350, the augmented reality application 360, the real-time authentication application 370, the interaction application 380 may instruct the processing device 320 to perform certain logic, data-processing, and data-storing functions of the LiDAR and AR based authorization system 300 described herein, as well as communication functions of the LiDAR and AR based authorization system 300.

The network provisioning application 340, the connection application 350, the augmented reality application 360, the real-time authentication application 370, the interaction application 380 are configured to invoke or use the data in the data repository 390 when communicating through the network communication interface 310 with the entity system 200, and/or the computing device system 400. In some embodiments, the network provisioning application 340, the connection application 350, the augmented reality application 360, the real-time authentication application 370, the interaction application 380 may store the data extracted or received from the entity system 200, and the computing device system 400 in the centralized data repository 390. In some embodiments, the network provisioning application 340, the connection application 350, the augmented reality application 360, the real-time authentication application 370, the interaction application 380 may be a part of a single application. The connection application 350 establishes a connection between entity devices and user devices of the users. The augmented reality application 360 provides an augmented reality environment on the user device of the user that allows user to provide authentication information and/or perform one or more interactions with entity devices. The real-time authentication application 370 authenticates the user based on information provided by the user. The interaction application 380 allows users to perform one or more interactions with entity devices, where the one or more interactions may be accessing information associated with user resources and/or entity resources. The functionalities of the network provisioning application 340, the connection application 350, the augmented reality application 360, the real-time authentication application 370, the interaction application 380 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, LiDAR devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 may include a LiDAR device 477 that allows the computing device system 400 to scan one or more unique identifiers associated with entity devices, provide real-time granular level location information corresponding to the location of the one or more unique identifiers (e.g., distance from the one or more unique identifiers), and/or any other features/information required by the system of the present invention. The computing device system 400 may further include an Augmented Reality (AR) chip that allows the system of the present invention to present one or more Augmented Reality (AR) features on the user device to carry out one or more steps of the present invention.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a LiDAR and AR based authorization application 421, entity application 424, an SMS application 423, or the like. The LiDAR and AR based authorization application 421 may comprise instructions to a graphical user interface (GUI) on the display 430 that allows the user 110 to interact with the entity system 200, the LiDAR and AR based authorization system 300, and/or other devices or systems. The graphical user interface provided by the LiDAR and AR based authorization application 421 may be an interactive user interface that allows the user to perform one or more actions described in FIG. 5. The memory 420 of the computing device system 400 may comprise a Short Message Service (SMS) application 423 configured to send, receive, and store data, information, communications, alerts, and the like via the wireless telephone network 152. In some embodiments, the LiDAR and AR based authorization application 421 provided by the LiDAR and AR based authorization system 300 allows the user 110 to access the LiDAR and AR based authorization system 300. In some embodiments, the entity application 424 provided by the entity system 200 and the LiDAR and AR based authorization application 421 allow the user 110 to access the functionalities provided by the LiDAR and AR based authorization system 300 and the entity system 200. In some embodiments, the entity application 424 may be an online banking application. In some embodiments, the entity application 424 may be any authentication application and/or authorization application provided by the entity system 200 or third party entity system 202.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a block diagram illustrating a process flow for authorizing entity users based on augmented reality and LiDAR technology, in accordance with an embodiment of the invention.

As shown in block 505, the system determines that a user has accessed an entity application provided by an entity via a user device. The entity application may be an online banking application, an authorization application, or an authentication application that may be used by the user to gain access to entity devices, user resources, and/or entity resources. The system may monitor the entity application to determine that the user has access the entity application.

As shown in block 510, the system receives a unique identifier from the user device of the user, via the entity application, where the unique identifier is scanned using LiDAR technology present in the user device of the user. The unique identifier may be any identifier that can be scanned by the user, via a user device comprising LiDAR technology, in order to gain access to entity resources (e.g., building, facilities, etc.) and/or entity devices (e.g., Automated Teller Machine (ATM), security gate, or the like). The LiDAR technology present in the user device allows the user to scan the unique identifier and also determines distance between the user and the unique identifier based on how long it takes a pulse of light to bounce back. The LiDAR technology present in the user device may send out thousands of light pulses every second to determine distances. The user upon reaching an entity location, may open the entity application and may scan the unique identifier via one or more components of the mobile device which includes the LiDAR technology component. The unique identifier may be at least one of a token, braille dots identifier, and an object that is located at any of entity locations near and/or on entity devices associated with an entity. In one example where the present invention authorizes a user to enter a building associated with the entity, the unique identifier may be present on a gate present at a checkpoint. In another example where the present invention authorizes a user to use an ATM, the unique identifier may be present on the entity device or in a location proximate to the ATM.

As shown in block 515, the system determines location of the user based on the unique identifier. In response to receiving the unique identifier via the entity application, decodes the information using relative distance between the unique identifier structure. Based on the decoded information, the system determines location of the user (e.g., location of the unique identifier).

As shown in block 520, the system determines an entity device associated with the unique identifier and location of the user. The system determines what entity device (e.g., Automated Teller Machine, security gate, or the like) is associated with the unique identifier and location of the user.

As shown in block 525, the system performs authentication of the user using at least one authentication method. The at least one authentication method may comprise modifying user interface of the user device or a secondary user device of the user to display an augmented reality environment, wherein the augmented reality environment comprises a keypad for entering a passcode, prompting the user to provide the passcode via the keypad in the augmented reality environment, receiving the passcode from the user device of the user, determining that the passcode provided by the user matches one or more user records, and authenticating the user based on determining that the passcode matches the one or more user records. The passcode may be any passcode that may be provided by the entity to access entity resources or set by the user to access user resources. In some embodiments, the keypad provided by the system in the AR environment may not be the regular keypad comprising numbers in a sequential manner. Instead, the keypad generated by the system may be a randomly generated keypad which provides an additional layer of security by preventing any unauthorized user from guessing the passcode/pin by observing the hand movements of the use while entering the passcode. In some embodiments, the system may use any other authentication method in combination with the authentication method described above. For example, the system may implement single use passcode authentication method in combination with the method described above. In some embodiments, the system instead of modifying the user interface of the user device or the secondary user device, transforms and/or transitions the current user interface that is visible to the user to another user interface which displays the AR environment.

As shown in block 530, the system determines that the authentication is successful and the process flow proceeds to block 535. As shown in block 535, the system continuously receives LiDAR scans from the user device, via the entity application. As explained above, the system may cause the LiDAR technology in the user device to continuously send out thousands of light pulses every second to scan the unique identifier.

As shown in block 540, the system determines real-time granular location of the user based on the LiDAR scans. Based on the light pulses, the system determines the real-time granular location of the user which allows the system to determine whether the user is directly in front of the entity device and/or the unique identifier or not. Based on the light pulses, the system also determines position of the user in a queue that is in front of the entity device and/or the unique identifier. As shown in block 545, the system provides access to an entity device based on successful authentication and the real-time granular location of the user.

In an exemplary embodiment, the user may be standing at a security checkpoint to gain access to a building and there may be other users waiting ahead in the queue. When the user scans the unique identifier while waiting in the queue, the system performs authentication of the user beforehand and when the user is about to be first in the queue, the system automatically transmits authorization signals to the gate at the security checkpoint such that the gate opens without any delay, thereby improving the overall efficiency of the process.

In another exemplary embodiment, the user may be standing at an Automated Teller Machine to gain access to user resources (e.g., funds in checking account) and there may be other users waiting ahead in the queue. When the user scans the unique identifier while waiting in the queue, the system performs authentication of the user beforehand and when the user is about to be first in the queue, the system automatically establishes a connection between the ATM and the user device and allows the user to perform interactions (e.g., financial transactions) via the augmented reality environment provided by the system. In some embodiments, the system may project the ATM screen in the Augmented Reality environment on the user device (e.g., controls to select one or more options that allows user to perform a transaction) and allows the user to perform the interaction via the AR environment without having to physically touch the ATM.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authorizing entity users based on augmented reality and LiDAR technology, the system comprising:
   a memory device with computer-readable program code stored thereon;
   a communication device; and
   a processing device operatively coupled to the memory device and the communication device, wherein the processing device is configured to execute the computer-readable program code to:
      receive a unique identifier from a user device of the user, where the unique identifier is scanned using LiDAR technology present in the user device of the user;
      determine location of the user based on the unique identifier;
      determine an entity device associated with the unique identifier;
      continue to receive LiDAR scans from the user device;
      determine real-time granular location of the user based on the LiDAR scans;
      determine from the real-time granular location whether the user is in front of the entity device and/or the unique identifier;
      perform authentication of the user using at least one authentication method, wherein the at least one authentication method comprises:
         modifying user interface of the user device or a secondary user device of the user to display an augmented reality environment, wherein the augmented reality environment comprises a keypad for entering a passcode;
         prompting the user to provide the passcode via the keypad in the augmented reality environment;
         receiving the passcode from the user device of the user;
         determining that the passcode provided by the user matches one or more user records; and
         authenticating the user based on determining that the passcode matches the one or more user records; and
      in response to determining that the authentication is successful and based on the determination from the real-time granular location of the user that the user is in front of the entity device and/or the unique identifier, provide access to the entity device.

2. The system according to claim 1, wherein the unique identifier is at least one of a token, a braille dots identifier, and an object.

3. The system according to claim 1, wherein the processing device is further configured to execute the computer-readable program code to:
   allow user to perform one or more interactions with the entity device to gain access to one or more resources, wherein the one or more resources are user resources or entity resources.

4. The system according to claim 1, wherein the secondary user device is an augmented reality device.

5. The system according to claim 1, wherein the entity device is an Automated Teller Machine.

6. The system according to claim 1, wherein the entity device is a security gate.

7. The system according to claim 1, wherein providing access to the entity device comprises transmitting real-time authorization signals to the entity device.

8. A computer program product for authorizing entity users based on augmented reality and LiDAR technology, the computer program product comprising at least one non-transitory computer readable medium having computer-readable program code portions embodied therein, the computer-readable program code portions comprising executable portions for:
 extracting data from one or more communication channels associated with an entity;
 receiving a unique identifier from a user device of the user, where the unique identifier is scanned using LiDAR technology present in the user device of the user;
 determining location of the user based on the unique identifier;
 determining an entity device associated with the unique identifier and location of the user;
 continuing to receive LiDAR scans from the user device;
 determining real-time granular location of the user based on the LiDAR scans;
 determining from the real-time granular location whether the user is in front of the entity device and/or the unique identifier;
 performing authentication of the user using at least one authentication method, wherein the at least one authentication method comprises:
  modifying user interface of the user device or a secondary user device of the user to display an augmented reality environment, wherein the augmented reality environment comprises a keypad for entering a passcode;
  prompting the user to provide the passcode via the keypad in the augmented reality environment;
  receiving the passcode from the user device of the user;
  determining that the passcode provided by the user matches one or more user records; and
  authenticating the user based on determining that the passcode matches the one or more user records; and
 in response to determining that the authentication is successful and based on the determination from the real-time granular location of the user that the user is in front of the entity device and/or the unique identifier, providing access to the entity device.

9. The computer program product of claim 8, wherein the unique identifier is at least one of a token, a braille dots identifier, and an object.

10. The computer program product of claim 8, wherein the computer-readable program code portions comprising executable portions for:
 allowing user to perform one or more interactions with the entity device to gain access to one or more resources, wherein the one or more resources are user resources or entity resources.

11. The computer program product of claim 8, wherein the secondary user device is an augmented reality device.

12. The computer program product of claim 8, wherein the entity device is an Automated Teller Machine.

13. The computer program product of claim 8, wherein the entity device is a security gate.

14. A computer-implemented method for authorizing entity users based on augmented reality and LiDAR technology, the method comprising:
 extracting data from one or more communication channels associated with an entity;
 receiving a unique identifier from a user device of the user, via the entity application, where the unique identifier is scanned using LiDAR technology present in the user device of the user;
 determining location of the user based on the unique identifier;
 determining an entity device associated with the unique identifier and location of the user;
 continuing to receive LiDAR scans from the user device;
 determining real-time granular location of the user based on the LiDAR scans;
 determining from the real-time granular location whether the user is in front of the entity device and/or the unique identifier;
 performing authentication of the user using at least one authentication method, wherein the at least one authentication method comprises:
  modifying user interface of the user device or a secondary user device of the user to display an augmented reality environment, wherein the augmented reality environment comprises a keypad for entering a passcode;
  prompting the user to provide the passcode via the keypad in the augmented reality environment;
  receiving the passcode from the user device of the user;
  determining that the passcode provided by the user matches one or more user records; and
  authenticating the user based on determining that the passcode matches the one or more user records; and
  determining that the authentication is successful; and
  in response to determining that the authentication is successful and based on the determination from the real-time granular location of the user that the user is in front of the entity device and/or the unique identifier, providing access to the entity device.

15. The computer-implemented method of claim 14, wherein the unique identifier is at least one of a token, a braille dots identifier, and an object.

16. The computer-implemented method of claim 14, wherein the method further comprises:
 allowing user to perform one or more interactions with the entity device to gain access to one or more resources, wherein the one or more resources are user resources or entity resources.

17. The computer-implemented method of claim 14, wherein the secondary user device is an augmented reality device.

18. The computer-implemented method of claim 14, wherein the entity device is an Automated Teller Machine.

19. The computer-implemented method of claim 14, wherein the entity device is a security gate.

20. The computer-implemented method of claim 14, wherein providing access to the entity device comprises transmitting real-time authorization signals to the entity device.

* * * * *